J. KUBISH.
FLYING MACHINE.
APPLICATION FILED AUG. 29, 1911.
1,027,258.
Patented May 21, 1912.
2 SHEETS—SHEET 1.
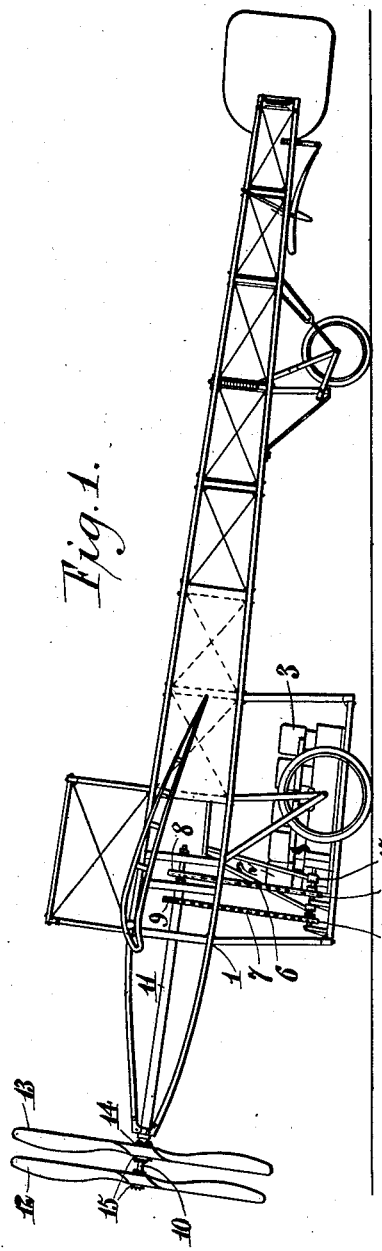
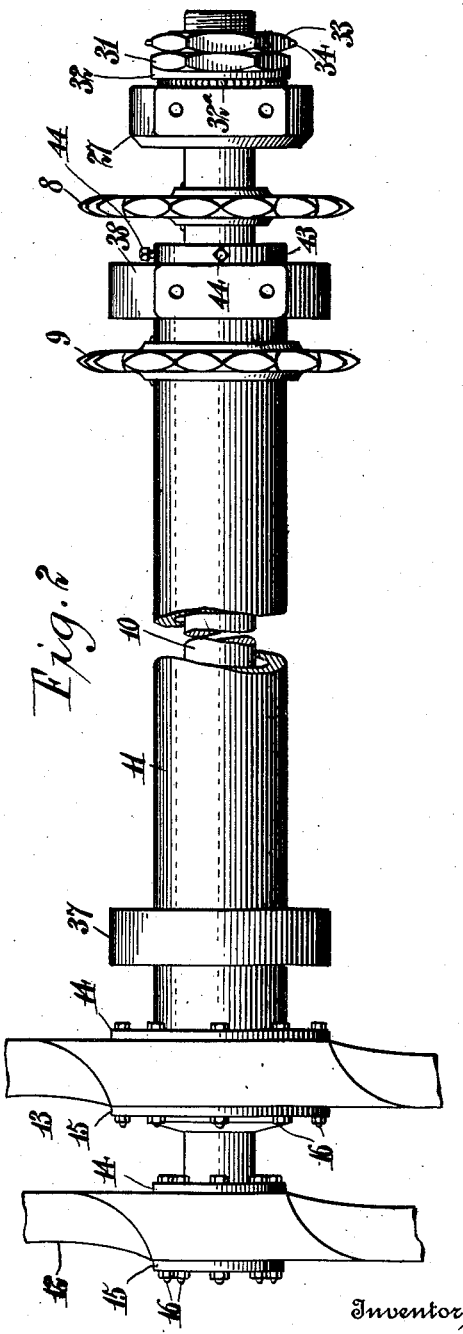
Witnesses:
Christ Feinle, Jr.
C. C. Hines
Inventor,
John Kubish.
By Victor J. Evans,
Attorney.

J. KUBISH.
FLYING MACHINE.
APPLICATION FILED AUG. 29, 1911.
1,027,258.
Patented May 21, 1912
2 SHEETS—SHEET 2.
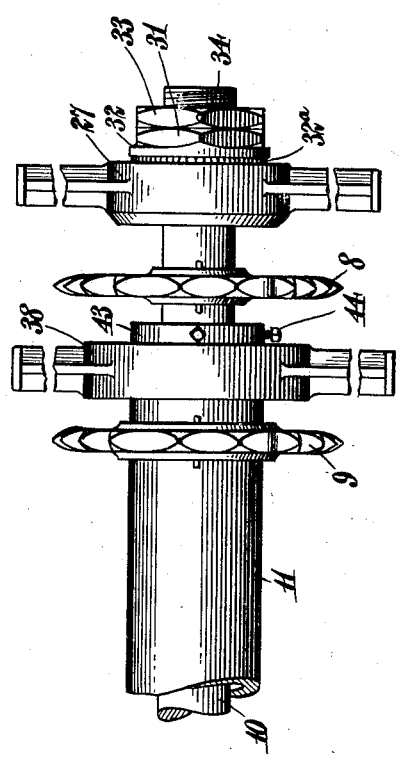
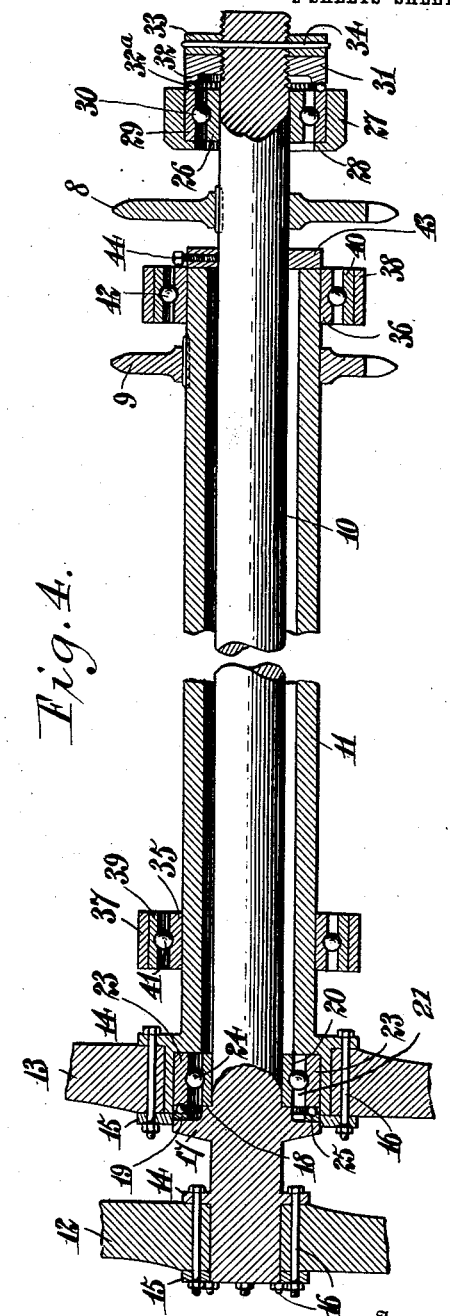
Witnesses:
Christ Feinle, Jr.
C. C. Hines
Inventor,
John Kubish.
By Victor J. Evans,
Attorney.

UNITED STATES PATENT OFFICE.

JOHN KUBISH, OF INDIAN ORCHARD, MASSACHUSETTS.

FLYING-MACHINE.

1,027,258.  Specification of Letters Patent.  Patented May 21, 1912.

Application filed August 29, 1911. Serial No. 646,597.

*To all whom it may concern:*

Be it known that I, JOHN KUBISH, a citizen of the United States, residing at Indian Orchard, in the county of Hampden and State of Massachusetts, have invented new and useful Improvements in Flying-Machines, of which the following is a specification.

This invention relates to flying machines, and particularly to propelling means therefor.

The object of the invention is to provide a propelling mechanism embodying independent propellers and motors, which may be operated simultaneously or independently and in the same or opposite directions, thereby securing greater safety and propelling efficiency, and in which the motors are disposed at a relatively low point upon the machine to promote stability.

A further object of the invention is to provide coaxially mounted propellers whose shafts are adapted to run easily and without interference and to be readily and conveniently set up for use or removed for cleaning the bearings or repairing any of the running parts.

The invention consists of the features of construction, combination and arrangement of parts hereinafter fully described and claimed, reference being had to the accompanying drawings in which:—

Figure 1 is a view in side elevation showing the application of the invention to a monoplane. Fig. 2 is a side elevation of the drive gearing on an enlarged scale. Fig. 3 is a top plan view thereof. Fig. 4 is a longitudinal section through the propellers, shafts and bearings.

Referring to the drawings, in which I have shown the application of my invention to a monoplane, 1 designates the main frame of the machine, upon which are supported separate and independent motors 2 and 3, arranged low down upon the frame of the machine to promote the stability thereof. On the drive shafts of the motors are sprocket gears 4 and 5 connected respectively by chains 6 and 7 with sprocket gears 8 and 9 upon the rear ends of a pair of concentric shafts 10 and 11 mounted upon the main frame above the motors. The shaft 11 is hollow to receive the shaft 10, which extends therethrough and projects therefrom at each end. The forward ends of the two shafts 10 and 11 carry propellers 12 and 13, the hub of each propeller being apertured to fit upon the end of the shaft and rest against a fixed clamping flange 14. The hub is clamped between said flange 14 and a clamping ring 15, through which hub, flange and ring pass bolts 16, whereby the propellers are firmly secured in position.

The shaft 10 is provided at its forward end with an annular abutment flange or shoulder 17 in rear of which is an abutment flange or shoulder 18. A bearing ring 19 is carried by the shoulder 17, and a bearing ring 20 surrounds the shaft and rests against the shoulder 18. The forward end of the shaft 11 is expanded to provide a bearing casing 21 having a rear shoulder 22, within which casing is disposed a bearing ring 23. The rings 20 and 23 have their opposing faces curved to form a race-way for anti-friction bearing balls 24, on which the forward end of the shaft 11 revolves, while the opposing faces of the rings 19 and 23 are similarly curved to form a race-way for bearing balls 25, which take up and limit the forward end thrust of the shaft 11 and insure a free and easy movement of the bearing parts upon each other. At its rear end the shaft 10 is provided with a bearing ring 26 arranged within a bearing collar or sleeve 27 on a portion of the main frame, said collar or frame having an outer inwardly projecting flange or shoulder 28. Within the sleeve is arranged a bearing ring 29 for coöperation with the bearing ring 26, the meeting faces of said rings being annularly grooved to form a race-way for bearing balls 30. In rear of the ring 26 the end of the shaft 10 is threaded to receive a threaded abutment nut 31 carrying a bearing ring 32, arranged opposite the rear face of the ring 29, said rings being curved to form a race-way for bearing balls 32$^a$, which limit the end thrust of the shaft 10 in a rearward direction. The nut 31 is held in fixed position by a jam or lock nut 33 fixed against casual disconnection by a locking pin 34 passing through the nut and shaft.

The shaft 11 is provided at front and rear with bearing rings 35 and 36 arranged to turn within bearing sleeves 37 and 38 mounted upon portions of the main frame, within which sleeves are disposed coöperating bearing rings 39 and 40, opposing faces of the respective pairs of bearing rings being curved to form race-ways for bearing balls 41 and 42, whereby the shaft 11 is journaled for easy and free revoluble movement. A collar 43 surrounds the shaft 10 and bears against the rear end of the shaft 11 to limit the rearward movement thereof, said collar being fixed in position by one or more set screws 44.

In practice, clutches 45 are provided for connecting the sprocket wheels 4 and 5 with the motor shafts and disconnecting the same therefrom, so that both propellers may be operated simultaneously, or either propeller operated independently of the other. It will be understood that the motors or driving shafts may be arranged to drive both propellers in the same direction or in opposite directions, as desired, and it will be seen that by providing each propeller with independent driving power one propeller may be kept constantly in action, should the motive power of the other fail, to maintain a continuity of flight of the machine. Of course, the propellers may be arranged at the front or rear of the main frame or at any other suitable point, without departing from the spirit or sacrificing any of the advantages of the invention.

Having thus described the invention, what I claim as new is:—

1. In a flying machine, a propeller mechanism comprising a pair of separate and independent motors, a pair of separate and independent shafts, said shafts comprising a short hollow shaft journaled on the machine frame and a longer shaft extending through said hollow shaft and journaled at its rear end upon the frame, the forward end of the inner shaft being provided with a flange and an annular shoulder in rear thereof, and the adjacent end of the hollow shaft being expanded to form a gear casing closed at its forward end by said flange, an outer bearing ring arranged within said casing and engaging the inner wall of the chamber, a bearing washer engaging the flange, anti-friction balls between said bearing ring and bearing washer, an inner bearing ring disposed between the inner wall of the bearing chamber and the shoulder on the inner shaft, anti-friction balls disposed between the outer and inner bearing rings, means upon the inner shaft and co-acting with the aforesaid flange to hold the shafts against relative endwise movement, gearing between the motors and the rear ends of said shafts, and propellers upon the forward ends of the shafts.

2. In a flying machine, the combination of a main frame, a chassis, separate and independent motors mounted on the chassis, bearing brackets mounted on the main frame, a hollow shaft mounted in certain of said bearing brackets, a second shaft extending through the outer or hollow shaft and journaled at its rear end in one of the brackets, said hollow shaft being provided at its forward end with an expanded portion forming a bearing chamber and the inner shaft being expanded at its forward end to form a flange and a shoulder respectively closing and projecting into said passage, a pair of spaced concentric bearing rings disposed in said chamber and resting against the inner wall thereof, the inner bearing ring also having engagement with said shoulder, bearing balls between said bearing rings, bearing balls between the flange and outer bearing ring, a collar secured to the inner shaft and engaging the rear end of the outer shaft for coöperation with said flange to hold the inner shaft against endwise movement, gearing between the rear ends of said shafts and the motors, and propellers upon the forward ends of the shafts.

In testimony whereof I affix my signature in presence of two witnesses.

JOHN KUBISH.

Witnesses:
   Thomas H. Kirkland,
   Clarence A. Rogers.